United States Patent
Mase et al.

(10) Patent No.: US 7,108,184 B2
(45) Date of Patent: Sep. 19, 2006

(54) CODING SYMBOLOGY AND A METHOD FOR PRINTING SAME

(75) Inventors: Joseph C. Mase, Chicago, IL (US); Margaret Trinidad, Spring Grove, IL (US); Scott Edwards, Libertyville, IL (US)

(73) Assignee: Baxter International, Inc., Deerfield, IL (US)

( * ) Notice: Subject to any disclaimer, the term of this patent is extended or adjusted under 35 U.S.C. 154(b) by 135 days.

(21) Appl. No.: 10/075,153

(22) Filed: Feb. 14, 2002

(65) Prior Publication Data

US 2003/0047616 A1   Mar. 13, 2003

Related U.S. Application Data

(60) Provisional application No. 60/280,073, filed on Mar. 30, 2001.

(51) Int. Cl.
*G06K 7/10* (2006.01)

(52) U.S. Cl. .................... 235/462.01; 235/462.05

(58) Field of Classification Search ............ 235/454, 235/462.04, 462.06, 468, 489, 491, 462.45, 235/462.01, 462.05
See application file for complete search history.

(56) References Cited

U.S. PATENT DOCUMENTS

| | | | | |
|---|---|---|---|---|
| 4,311,810 A | * | 1/1982 | Fujii et al. | 525/321 |
| 4,559,872 A | * | 12/1985 | Perra, Jr. | 101/228 |
| 4,791,284 A | | 12/1988 | Ludden | |
| 4,844,259 A | * | 7/1989 | Glowczewskie et al. | 206/370 |
| 4,884,904 A | * | 12/1989 | Berquist | 400/120.16 |
| 4,887,208 A | * | 12/1989 | Schneider et al. | 705/28 |
| 4,939,009 A | * | 7/1990 | Beavers et al. | 428/35.2 |
| 4,983,817 A | * | 1/1991 | Dolash et al. | 235/462.04 |
| 4,985,115 A | | 1/1991 | De Rossett, Jr. | |
| 5,029,312 A | | 7/1991 | Goenner | |
| 5,164,573 A | * | 11/1992 | Ishikawa | 235/454 |
| 5,187,546 A | * | 2/1993 | Johnston | 356/499 |
| 5,195,123 A | | 3/1993 | Clement | |
| 5,206,490 A | | 4/1993 | Petigrew et al. | |
| 5,237,164 A | * | 8/1993 | Takada | 235/487 |
| 5,288,976 A | * | 2/1994 | Citron et al. | 235/375 |
| 5,319,182 A | * | 6/1994 | Havens et al. | 235/462.42 |
| 5,366,791 A | | 11/1994 | Carr et al. | |
| 5,418,357 A | * | 5/1995 | Inoue et al. | 235/462.11 |
| 5,441,796 A | | 8/1995 | Steidinger et al. | |

(Continued)

FOREIGN PATENT DOCUMENTS

CN          1279441          1/2001

(Continued)

OTHER PUBLICATIONS

International Search Report ("ISR"), and the "Notification of Transmittal of the International Search Report or the Declaration," issued by the European Patent Office as the International Searching Authority and pertaining to International Application PCT/US02/10095 having an International filing date of Mar. 28, 2002, and naming Baxter International Inc. as the Applicant.

(Continued)

*Primary Examiner*—Thien M. Le
*Assistant Examiner*—Kumiko C. Koyama
(74) *Attorney, Agent, or Firm*—Joseph P. Reagen; Jeffrey C. Nichols (57) ABSTRACT

The present invention includes forming a coding symbology by disposing a plurality of light-reflecting segments separated by spaces on a substrate. The coding symbology represents fixed information and variable information.

42 Claims, 5 Drawing Sheets

U.S. PATENT DOCUMENTS

| | | | |
|---|---|---|---|
| 5,486,689 A * | 1/1996 | Ackley | 235/462.16 |
| 5,493,107 A | 2/1996 | Gupta et al. | |
| 5,514,123 A * | 5/1996 | Adolf et al. | 604/411 |
| 5,527,407 A | 6/1996 | Gartland et al. | |
| 5,547,501 A | 8/1996 | Maruyama et al. | |
| 5,563,401 A | 10/1996 | Lemelson | |
| 5,568,177 A | 10/1996 | Talvalkar et al. | |
| 5,633,488 A | 5/1997 | Spitz | |
| 5,701,538 A | 12/1997 | Yasui | |
| 5,739,520 A * | 4/1998 | Atsumi et al. | 235/462.45 |
| 5,814,806 A | 9/1998 | Tanaka et al. | |
| 5,824,216 A * | 10/1998 | Joie et al. | 210/257.1 |
| 5,845,264 A | 12/1998 | Nellhaus | |
| 5,893,459 A * | 4/1999 | Croft | 206/460 |
| 5,966,457 A | 10/1999 | Lemelson | |
| 6,000,616 A | 12/1999 | Spitz | |
| 6,005,595 A | 12/1999 | Vanwey | |
| 6,010,970 A * | 1/2000 | McGinty et al. | 442/365 |
| 6,017,125 A * | 1/2000 | Vann | 359/529 |
| 6,032,861 A | 3/2000 | Lemelson et al. | |
| 6,070,801 A | 6/2000 | Watanabe et al. | |
| 6,098,892 A * | 8/2000 | Peoples, Jr. | 235/494 |
| 6,135,350 A | 10/2000 | White et al. | |
| 6,154,733 A | 11/2000 | Pierce et al. | |
| 6,165,937 A | 12/2000 | Puckett et al. | |
| 6,176,429 B1 | 1/2001 | Reddersen et al. | |
| 6,267,291 B1 * | 7/2001 | Blankenship et al. | 235/375 |
| 6,297,322 B1 * | 10/2001 | Ding et al. | 525/191 |
| 6,297,874 B1 | 10/2001 | Ikeda et al. | |
| 6,355,024 B1 * | 3/2002 | Small et al. | 604/500 |
| 6,408,286 B1 * | 6/2002 | Heiden | 705/408 |
| 6,468,424 B1 | 10/2002 | Dönig et al. | |
| 6,505,778 B1 | 1/2003 | Reddersen et al. | |
| 6,520,412 B1 | 2/2003 | Umeta | |
| 6,641,039 B1 * | 11/2003 | Southard | 235/385 |
| 6,729,369 B1 * | 5/2004 | Neas et al. | 141/231 |
| 2001/0040127 A1 | 11/2001 | Dönig et al. | |
| 2002/0056759 A1 | 5/2002 | Schuessler | |
| 2002/0121553 A1 | 9/2002 | Schuessler | |
| 2002/0125330 A1 | 9/2002 | Schuessler et al. | |

FOREIGN PATENT DOCUMENTS

| | | |
|---|---|---|
| DE | 43 13 807 A1 | 11/1993 |
| DE | 198 04 997 C1 | 2/1999 |
| DE | 19806049 A1 | 8/1999 |
| EP | 0 408 896 A1 | 1/1991 |
| EP | 0 408 896 B1 | 1/1991 |
| EP | 06 155887 A | 6/1994 |
| EP | 0 354817 B1 | 11/1995 |
| GB | 2 153 334 A | 8/1985 |
| GB | 2 270 392 A | 9/1994 |
| HU | 38457 B | 5/1986 |
| JP | 2802975 | 6/1994 |
| WO | WO 99/49408 | 9/1999 |

OTHER PUBLICATIONS

LaMoreaux, *Barcodes and other Automatic Identification Systems.* 1995, pps. 159-177, Pira International, Surrey, United Kingdom.

Mosher, "Bar Code Standards: for Medical Products, More Work is Needed", *Medical Device & Diagnostic Industry* Magazine, Sep., 1996, 5 pages.

*A Bar Code Primer*, 1997 and 2000, 40 pages, Worth Data Inc.

*Bar Code Primer—Introduction to Barcoding*, 2001, 25 pages, Worth Data, Inc.

Description of the "UCC Quality Specification for the U.P.C. Printed Symbol", Uniform Code Council, Inc., 2000, 17 pages.

Description of the "UCC Quality Specification for the U.P.C Printed Symbol", Uniform Code Council, Inc., 2001, 50 pages.

.Brochure entitled "At the Heart of Health Care Product Identification," published by the Uniform Code Council, Inc., date unknown, pp. 1-21.

Document entitled: "Executive Summary", published by Uniform Code Council, Inc., date of publication unknown; published at www.ucc-council.org.

Document entitled: "EAN UCC System—Space: The Next Frontier in Automatic Identification & Data Capture", published by Uniform Code Council, Inc., date of publication unknown; published at www.ucc-council.org.

Document entitled: "UPN-One Product, One Number HIBCC & UCC/EAN", published by Uniform Code Council, Inc., date of publication unknown; published at www.ucc-council.org.

Document entitled: "Symbology", published by Uniform Code Council, Inc., date of publication unknown; published at www.ucc-council org.

Document entitled: "At the Heart of Health Care—Product Indentification", published by Uniform Code Council, Inc., date of publication unknown; published at www.ucc-council.org.

Document entitled: "Executive Summary—Important Changes Regarding UCC Company Prefixes", published by Uniform Code Council, Inc., date of publication unknown; published at www.ucc-council.org.

Document entitled: "Introduction to Data Requirements", published by Uniform Code Council, Inc., date of publication unknown; published at www.ucc-council.org.

Document entitled: "Integrated Supply Chain Tools in the Pharmaceutical Industry", published by Uniform Code Council, Inc.; date of publication unknown; published at www.ucc-council.org.

Document entitled: "Integrated Supply Chain Management for Healthcare", published by Uniform Code Council, Inc., date of publication unknown; published at www.ucc-council.org.

Document entitled: "Primary Info. Requested for Bar Coding Small Pkgs. of Healthcare Prods.", published by Uniform Code Council, Inc., date of publication unknown; published at www.ucc-council.org.

Document entitled: "Secondary Info. Requested for Bar Coding Small Pkgs. of Healthcare Prods.", published by Uniform Code Council, Inc., date of publication unknown; published at www.ucc-council.org.

Document entitled: "Data Element Requirements", published by Uniform Code Council, Inc., date of publication unknown; published at www.ucc-council.org.

Document entitled: "Overview", published by Uniform Code Council, Inc., date of publication unknown; published at www.ucc-council.org.

Document entitled: "Regulatory Perspective", published by Uniform Code Council, Inc., date of publication unknown; published at www.ucc-council.org.

Document entitled: "Manufacturer Perspective", published by Uniform Code Council, Inc., date of publication unknown; published at www.ucc-council.org.

Document entitled: "Conclusions", published by Uniform Code Council, Inc., date of publication unknown; published at www.ucc-council.org.

English Abstract for CN1279441.

Derwent Record for DE 19804997C1 including English Language Abstract.

Derwent Record for DE 4313807A1 including English Language Abstract.

Translation of Office Action in counterpart Russian Application 2003131888/09(034418).

* cited by examiner

CODING SYMBOLOGY AND A METHOD FOR PRINTING SAME

CROSS REFERENCE TO RELATED APPLICATION

This application claims priority to copending U.S. Provisional Application entitled "Coding Symbology and a Method for Printing Same", having serial No. 60/280,073, filed Mar. 30, 2001, which is entirely encorporated herein by reference.

DESCRIPTION

1. Technical Field

The present invention relates to a coding symbology containing fixed information and variable information, as well as a method for transferring same. The invention is especially suitable for flexible, transparent thermoplastic containers of liquid products that are commonly used in medical procedures.

2. Background of the Invention

Various foodstuffs, liquids, and other substances can be sterilely packaged in pouch-type flexible containers made from webs of flexible film, sheet stock, or like material that is sealed together along the peripheral edges. There are a number of advantages to these pouch-type flexible containers, including low weight, durability, and low cost fabrication.

Various medical solutions are sterilely packaged in pouch-type flexible containers. The medical solutions can be pharmaceutical, flushes, nutrition, irrigating, respiratory therapy agents, dialysis, blood, blood products, plasma derivatives, plasma expanders, blood substitutes, anti-coagulants, blood preservatives, and the like. Such solutions can be delivered to a patient through an administration tubing set connected with the flexible container. Other medical solutions include enterals, anesthesia inhalants, veterinarian, media, and the like. The container may include one or more access tubes or fittings through which the liquid is pumped to fill initially the container during manufacture of the package and to which the administration set and The use of bar coding to identify the contents of a container is widespread in the medical industry. For example, bar code identification systems allow a hospital to track electronically its inventory of pharmaceutical products, and the subsequent billing to the patient for the use thereof. Bar codes are also used in automated agent compounding systems to mix properly the correct and proper amounts of medical and therapeutic agents. More important, bar codes also allow hospitals to monitor its medications or other therapeutic fluids that are targeted for infusion into its patients by marking same with fixed information such as product code names or numbers.

Historically, a two-color system was implemented in bar coding systems. That is, a typical bar code consisted of black lines on a white background. When a bar code reader would read the bar code, the black lines would absorb the reader's laser light while the white spaces would reflect the reader's laser light back to the reader where the reflected information was translated into its corresponding analog counterpart. This two-color system naturally led to the development of a two-step process for printing the bar code.

First, the container was passed through a printing machine that applied a reflective (generally white) background field for the bar code. Next, the container was passed through a second printing machine that applied the dark, light-absorbing lines of the bar code over the top of the background field. One common printing method was the hot-stamping (die-cast) system.

In a hot-stamping system, a metal die is engraved in the desired image or bar code, heated to a predetermined temperature, and applied under pressure to the substrate in order to transfer the image or bar code from the hot-stamp foil. The foil acts as the pigment (ink) carrier and is fed between the hot-stamp die and the substrate. One problem is that the die has sharp edges that oftentimes damage the flexible substrates heretofore mentioned, thus increasing the scrap rate. Still yet another problem is that the hot-stamp die is costly to produce, taking several hours, or even days, to manufacture. Accordingly, a hot-stamping system is unsuitable for printing images representative of variable information such as lot numbers, batch numbers, expiration dates or any other data that changes in a fixed time period, such as by the minute, hour, or day.

Consequently, the hot-stamping system can be used to print feasibly only fixed information such as a product's name, manufacturer, and the like. One method of overcoming this deficiency is to print labels and apply them to the product. Naturally, this increases costs and decreases production rates, as well as opens the possibility for the label(s) to fall off of the product.

Several other problems exist with the hot-stamping system as it relates to the readability of the bar codes on flexible, transparent containers such as those commonly used in the medical industry. The first problem with the readability of images printed by the hot-stamping system is that the transparent (light-absorbing) nature of the containers in such systems requires that a solid (light-reflecting) background block be printed on the container before the dark (light-absorbing) lines of the bar code can be printed thereon. Not only is there the increased cost associated with two printing passes to achieve the two colors, but it is also fundamentally difficult to print a solid background block using the hot-stamping method because air pockets commonly form in the ink, which cause voids in the block, resulting in an unreadable bar code. Additionally, because the background block naturally requires more pigment or ink than the contrasting bars, there is an increased risk for pigment extractives and leachables to exist in the container's solution.

A second problem is that because the hot-stamping system uses variable heat, variable pressure, and a fixed dwell time to transfer images or bar codes onto the substrate, there is a problem of the ink bleeding or growing too thick, which causes an unreadable bar code or poor edge definition of the bar code symbology. To correct this problem, the dies have to be redesigned, re-machined, or re-engraved at a reduced size so that when applied, the correct bar code size is achieved. Alternatively, the size of the bar code symbology, including bar spacing, could be increased if space limitations on the substrate so allowed. Both solutions, however, increase costs and decrease productivity. A third problem is that the inks in a hot-stamping system are designed to adhere to the underlying substrate, and not each other, further contributing to an unreadable bar code and mandating the development of inks that adhere to each other. Fourth, hot-stamping typically yields a bar code with a "D" or "F" American National Standards Institute (ANSI) scale read (with "A" being the highest resolved image). See e.g, *American National Standard for Information Systems—Bar Code Print Quality Guidelines*, by The American National Standards Institute, ©1990 by Information Technology Industry Council, and which is incorporated by reference as though set forth herein.

At least one attempt has been made to reduce the problems associated with a two-color, hot-stamping system, and is found in PCT patent application number PCT/US99/05614, bearing International Publication Number WO 99/49408, which is incorporated herein by reference as though fully set forth herein. The '408 application discloses a container bearing a negative image bar code generated using the above-described hot-stamping system (page 8, lines 22–24). The bar code is a negative image in that the light-reflecting segments of the underlying substrate correspond to the background spaces (generally white) of a traditional bar code, and the light-absorbing segments of the underlying substrate correspond to the light-absorbing dark segments (generally black) of a traditional bar code.

Even prior thereto, the ability to print a negative bar code image had been known in the art as evidenced in the publication *Barcodes and Other Automatic Identification Systems*, by Robert D. LaMoreaux at page 176, ©1995 by Pira International, which is incorporated herein by reference as though fully set forth herein. Notwithstanding the advantages of a one-color system, the remaining aforementioned problems with the hot-stamping system still exist, including the inability to print fixed and variable information in a single printing pass.

Unlike the hot-stamping system, the thermal transfer printing system uses a low level of heat that transfers images (such as a bar code) from a printing head under light contact with the substrate. Because the bar code is not printed under pressure, there is a superior bar code symbology edge definition. That is, thermal transfer printing generally yields bar codes with an "A" or "B" ANSI scale read. Furthermore, the present inventors found that when an "A" quality code is printed using the thermal transfer system, the same code produces a "C" quality read through a 10 mil high-density polyethylene overpouch, the overpouch being well-known in the medical art.

Another benefit of the thermal transfer printing system is that because the print head contains no sharp edges like the hot-stamp die, the print head does not damage the flexible substrate, thus reducing the scrap rate. Another benefit is that the thermal transfer printing system uses less pigment or ink that the hot-stamping system, resulting in a lower risk of leachables or extractables in the container's solution. Still another benefit is that the thermal transfer printing head yields a higher degree of flexibility than the hot-stamp die because the image information can be easily changed in a matter of minutes at an input terminal, as opposed to waiting hours, or even days, for a hot-stamp die to be redesigned, re-machined, or even re-created. There are a number of these thermal transfer systems commercially available from different manufacturers such as SmartDate® (MARKEM) and Jaguar J27i4 (Norwood Marking Systems).

Still yet another benefit of the thermal transfer printing system over the hot-stamping system is the ability to print smaller bar codes that will be accurately read. For example, the thermal transfer printing system requires on average approximately one-third to two-thirds of the length required for the hot-stamping system to print a code of a comparable symbol grade, depending on the substrate. In short, the thermal transfer printing system requires less space and provides superior bar code edge definition over the hot-stamping system. These advantages allow one to print fixed and variable information, including the label copy information, on pharmaceutical and medical agents, on either side, or both sides, of a container. Conversely, the size and resolution limitations of the hot-stamping method force one to print fixed information on one side of the container and variable information on the other side. These limitations add the manipulation of turning the container over and running a second printing pass, which in turn, increases costs and decreases productivity. Accordingly, the thermal transfer printing system affords improved cost efficiency, time efficiency, and bar code image resolution over the hot-stamping system. Notwithstanding, there still exists the problem of printing in a single pass a high resolution, one-color bar code that contains both fixed information and variable information.

The present invention is provided to solve these and other problems.

SUMMARY OF THE INVENTION

The present invention provides a novel identification system and a method for employing the system. The identification system can be used to control inventory, to track a patient's billing, to monitor particular dosages, to reduce potentially patient safety errors when used in combination with other safety systems possibly not yet employed and those as described in U.S. Pat. Nos. 6,139,495; 6,032,155; 5,845,264; and 5,700,998 which are incorporated by reference as though fully set forth herein, and to accomplish innumerable other means and methods.

The coding symbology of the present invention comprises a substrate and a plurality of light-reflecting segments separated by spaces that are disposed on the substrate. The spaces on the substrate define light-absorbing segments. Together, the light-reflecting segments and the light-absorbing segments define a negative image bar code representing fixed information and variable information.

The present invention further provides that the coding symbology is detectable using a reader. It is understood that a reader can be any form of a bar code reader presently known, the details of which form no part of the present invention. In general, the bar code reader directs a form of energy on the image or bar code and receives all or a portion of the energy that is reflected from the image or bar code. Preferably, the reader will then translate the reflected energy into a data form readily understood by humans.

The present invention also provides that the light-reflecting segments are indicia that can be detected by a reader, even though the indicia may or may not be visible to the naked human eye. That is, the light-reflecting segments may exist at a wavelength outside the visible light spectrum. It is known within the art that bar codes could be fluorescent, which is outside the visible spectrum and is the subject of U.S. Pat. No. 5,547,501, which is incorporated by reference as though fully set forth herein. In short, the present invention contemplates both visible and invisible coding symbologies, or a combination thereof, provided that the reflectivity difference between the light-reflecting segments disposed on the substrate and the light-absorbing segments defined on the substrate enables the resulting image to be detected by a reader. If the indicia are visible to the naked human eye, the indicia can have a color within the visible light spectrum.

The substrate can be of any chemical composition, preferably comprising a thermoplastic polymer or a thermoset polymer, and even more preferably where the substrate comprises a medical container. In another embodiment, two or more coding symbologies are disposed on a substrate wherein the combination of the two or more codes represents fixed and variable information. Two or more codes could also be disposed within a container system comprising at least one substrate forming a container and at least one material. One coding symbology or a plurality of symbologies could be disposed anywhere in the container system. The present invention contemplates that the container system comprises a substrate forming a medical container and a material forming an overpouch that covers at least a part of the substrate.

The present invention also provides a method for transferring a negative image bar code onto a web of material by first providing a web of material. The next step of the method is to provide a printer capable of transferring a negative image bar code onto the web in response to a signal representative of the negative image bar code. According to the invention, the negative image bar code represents fixed information and variable information. The negative bar code image is then transferred to the printer via the signal and transferred onto the web of material. Preferably, the printer is a thermal transfer printer. The present method also contemplates that any predetermine number of negative image bar codes could be transferred in this manner.

Additional features and advantages of the present invention are described in, and will be apparent from, the best mode for carrying out the invention.

DETAILED DESCRIPTION OF THE PREFERRED EMBODIMENT

While this invention is susceptible of embodiments in many different forms, and will herein be described in detail, preferred embodiments of the invention are disclosed with the understanding that the present disclosure is to be considered as exemplifications of the principles of the invention and are not intended to limit the broad aspects of the invention to the embodiments illustrated.

Figure 1:
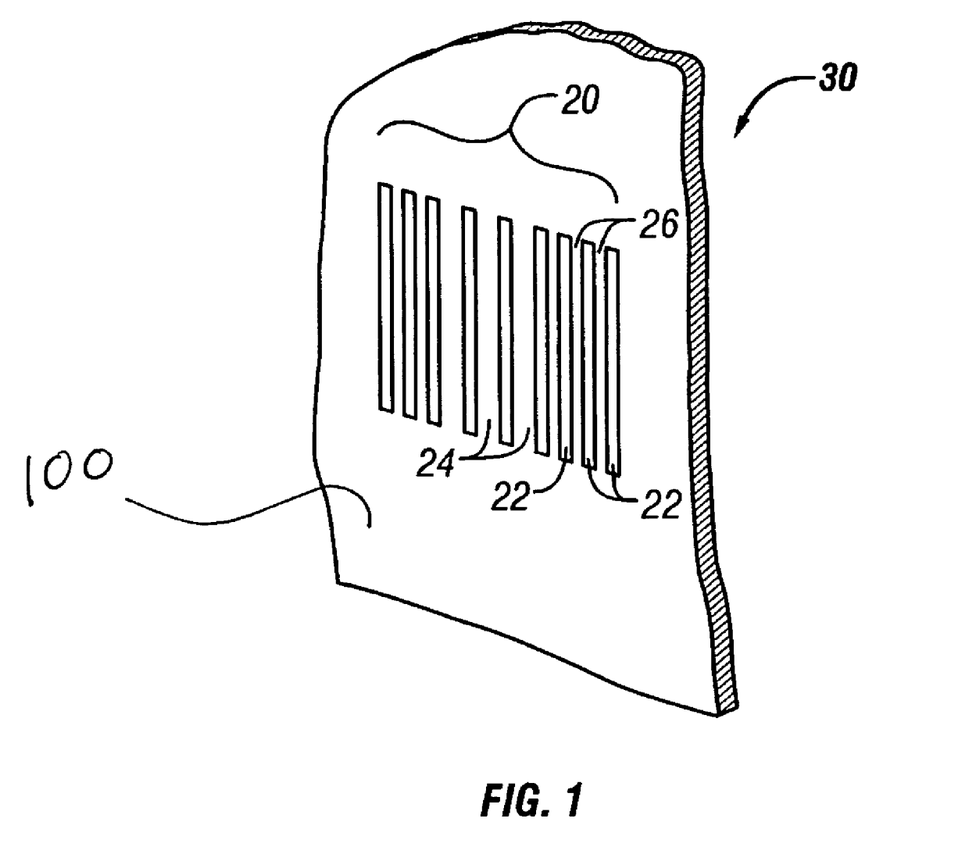
FIG. 1 is a fragmentary, perspective view of a coding symbology representing fixed information and variable information in a single, collective image transferred onto a substrate.

FIG. 1 illustrates a negative image bar code image representing fixed information and variable information that is transferred on a substrate. The bar code is designated generally by reference numeral 20. The bar code 20 includes a plurality of light-reflecting segments 22 that are separated by spaces 24. The spaces 24 define light-absorbing segments 26. The light-reflecting segments 22 and light-absorbing segments 26 define the negative image bar code 20 representing fixed information and variable information. The bar code 20 and the light-reflecting segments 26 are disposed on a substrate 30.

The substrate 30 can be any known chemical composition, including a thermoplastic or thermoset polymer. Suitable thermoplastic and thermoset polymers are polyvinylchloride, polyvinyldichloride, polyolefins, polyamides, polycarbonates, polyesters, thermoplastic elastomers, elastomers, polyimides, polyurethanes, ethylene vinyl alcohol copolymers, ethylene vinyl acetate copolymers, ethylene copolymers, propylene copolymers, acrylic acid copolymers, ethylene substituted acrylic acid copolymers, α-olefin substituted acrylic acid copolymers, hydrocarbon block polymers, ethylene propylene diene polymers, nylon, monolayer film structures, and multi-layer film structures such as those disclosed in U.S. Pat. Nos. 6,168,862; 6,083,587; 5,998,019; 5,993,949; 5,935,847; 5,693,387; 5,686,527; 4,299,367; and 3,912,843, which are incorporated by reference as though fully set forth herein. The α-olefin, which preferably contains about 2 to 20 carbons, could be produced by any method known generally. More particularly, the α-olefin is ethylene or propylene.

Preferably, the substrate 30 is of a chemical composition such that the reflectivity difference between the substrate 30 and the light-reflecting segments 22 allows the light-reflecting segments 22 to form indicia (not shown) that can be detected by a reader (not shown). In terms of percent reflectance, it is known in the art that a preferred maximum reflectance for the light-absorbing segments of a coding symbology is about 25 percent, which also corresponds to the preferred minimum reflectance for the light-reflecting segments. The maximum reflectance of the light-absorbing segments and the minimum reflectance of the light-reflecting segments need not be achieved simultaneously. It is preferred that the overall profile reflectance grade of the coding symbology permits the light-reflecting segments, and more preferably the coding symbology, to be detected by a reader.

The indicia of the light-reflecting segments 22 may not be visible to the naked human eye, or preferably, may be visible to the naked human eye so that the bar code 20 can be easily located and read by a bar code reader (not shown). The indicia of the light-reflecting segments 22 may be colored white, red, yellow, orange, gold, silver, or any combination thereof. The preferred color will depend on the reflective index of the chosen substrate and on the wavelength of energy used by the reader. As previously stated, it is understood that any color may be used provided that the reflectivity difference between the substrate 30 and the light-reflecting segments 22 allows the light-reflecting segments 22 to form indicia (not shown) that can be detected by a reader (not shown).

According to the invention, fixed information is defined to be information that remains unchanged for a first period of time while variable information is defined to be information that changes during the first period. Examples of fixed information include, but are not limited to, a product's: name, code number, manufacturer, National Drug Code Number, label copy data required by the Federal Food & Drug Administration (FDA), or data required by the Health Industry Bar Code Council, now known as the Health Industry Business Communications Council (HIBCC), and the like. Examples of variable information include, but are not limited to, a product's: lot number, batch number, expiration date, serial number, production time, price, inventory control data, and concentration.

Figure 2:
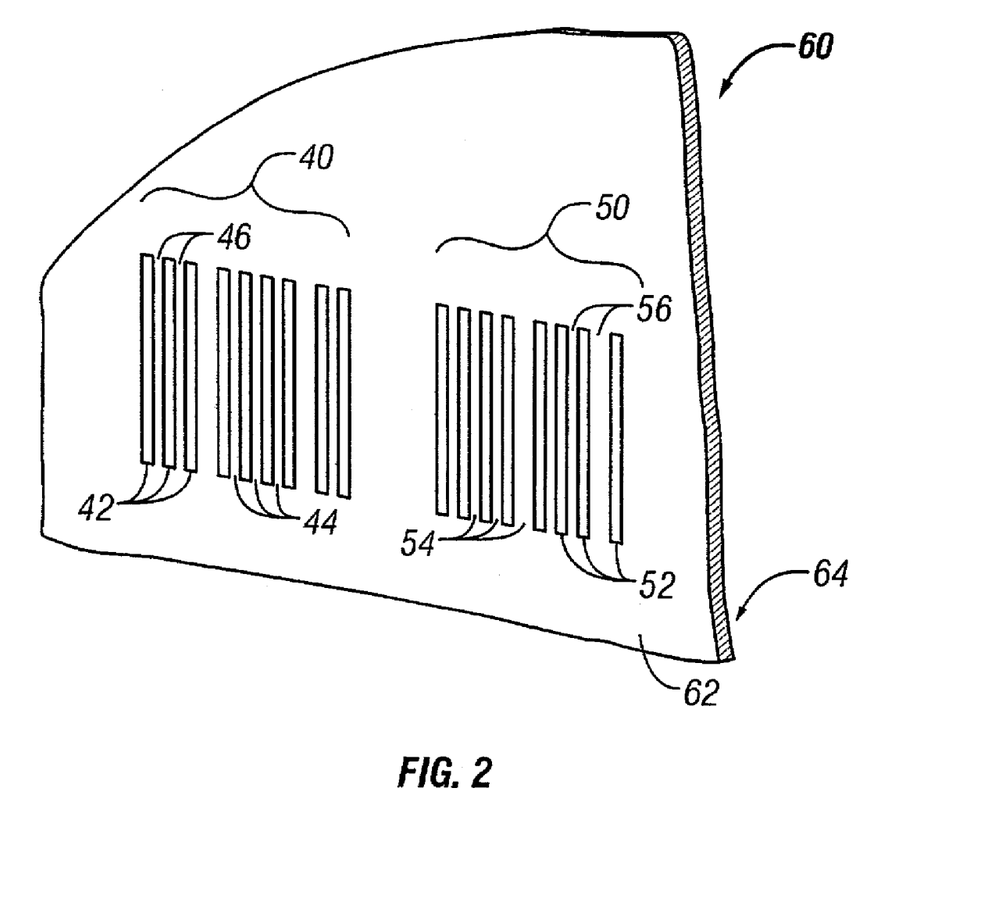
FIG. 2 is a fragmentary, perspective view of a coding symbology representing fixed information and variable information in at least two, collective images transferred onto a substrate.

FIG. 2 shows another contemplated commercial embodiment of the present invention and illustrates a fragmentary, perspective view of a coding symbology representing fixed information and variable information in at least two, collective images. The coding symbology contains a first bar code 40 representing fixed information and a second bar code 50 representing variable information. The first bar code 40 is defined, in part, by a first plurality of light-reflecting segments 42 separated by spaces 44 and disposed on the substrate 60. The spaces 44 define a first set of light-absorbing segments 46, which further define the remainder of the first bar code 40.

The second bar code 50 represents variable information. The second bar code 50 is defined, in part, by a second plurality of light-reflecting segments 52 separated by spaces 54. The spaces 54 define a second set of light-absorbing segments 56, which further define the remainder of the second bar code 50. It is understood that the first plurality of light-reflecting segments 42 and second plurality of light-reflecting segments 52 may be of the same chemical composition, although it is not necessary. In a preferred form of the invention, the first plurality of light-reflecting segments 42 and the second plurality of light-reflecting segments 52 are a first indicia (not shown) and a second indicia (not shown), respectively, that can be detected by a reader as heretofore described. The first bar code 40 and the second bar code 60 are disposed on the substrate 60.

As with the indicia related to the light-reflecting segments 22 of the previous embodiment, the first indicia and the second indicia of the present embodiment may not, or preferably may be, visible to the naked human eye. The first indicia (not shown) of the first plurality of light-reflecting segments 42 or the second indicia (not shown) of the second plurality of the light-reflecting segments 52 may be colored white, red, yellow, orange, gold, and silver. The preferred color will depend on the reflective index of the chosen substrate and on the wavelength of energy used by the reader. As previously stated, it is understood that any color may be used provided that the reflectivity difference between the substrate 60 and the light-reflecting segments 42, and between the substrate 60 and the light-reflecting segments 52, allow the light-reflecting segments 42 and the light-reflecting segments 52 to form a first indicia (not shown) and a second indicia (not shown), respectively, that can be detected by a reader (not shown).

The present invention contemplates that any predetermined number of bar codes could be disposed on substrate 60 by repeating this procedure. Additionally, it is also understood that substrate 60 could include a predetermined number of symbologies like bar code 20 where fixed information and variable information are within the same symbology. It is also understood that the coding symbologies disclosed herein may be used in conjunction with any current bar code symbologies including, but not limited to: Code 16K, Code 39, Code 49, Codabar, Code 128, UPC-E, UPC-A, EAN-8, EAN-13, Reduced Space Symbology (RSS), composite symbol, PDF-417, Interleaved 2-of-5 (ITF), as well as two dimensional symbologies. It is further understood that either substrate 30 or substrate 60, alone or in combination, could be used to further define a container whole or in part. It is contemplated that the container could be a medical container used to store medical solutions such as pharmaceutical, flushes, nutrition, irrigating, respiratory therapy agents, dialysis, blood, blood products, plasma derivatives, plasma expanders, blood substitutes, anti-coagulants, blood preservatives, and the like. It is also contemplated that the container could be a pouch-type flexible container. What is meant by flexible is that the mechanical modulus of the container is less than or equal to 40,000 psi when measured according to ASTM D-882.

As shown in FIG. 2, the substrate would have an interior surface 64 opposed to an exterior surface 62 that would, in turn, define the interior surface (not shown) and an exterior surface (not shown) of a container. The present invention contemplates that the first bar code 40 or the second bar code 50 could be disposed on the interior surface 64 or the exterior surface 62, or both. Any predetermined number of symbologies could also be disposed on the interior surface 64 or the exterior surface 62, or both. It is also contemplated that the first bar code 40, the second bar code 50, or any predetermined number of bar codes (not shown) could be oriented in any manner, including by not limited to, adjacent, stacked, or overlapping.

Figure 3:
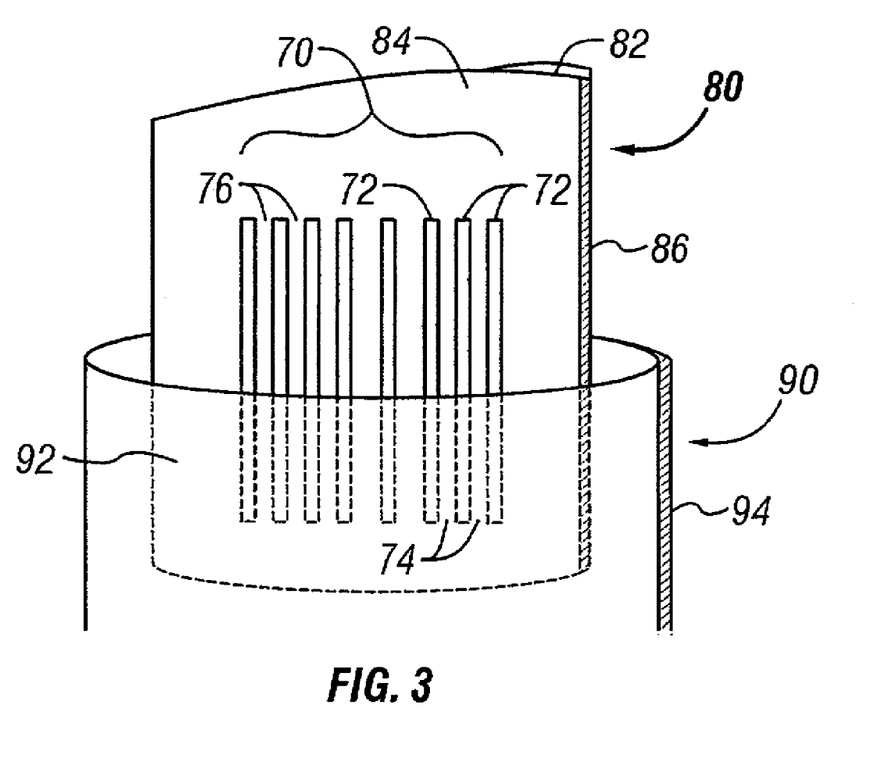
FIG. 3 is a fragmentary view of a container system having a substrate with a coding symbology representing fixed information and variable information, and a material positioned over a portion of the coding symbology.

FIG. 3 is a fragmentary, perspective view of a container system having a substrate with a coding symbology representing fixed information and variable information, and a material positioned over a portion of the coding symbology. In one embodiment, there is a primary container, which is referenced by number 80. The primary container 80 has a substrate 82 that may be of the same chemical composition as substrate 30 or substrate 60 previously described, although it is not necessary. Similar to the previously described embodiments, there is a plurality of light-reflecting segments 72 separated by spaces 74 and that are disposed on the substrate 82. The spaces 74 define light-absorbing segments 76. Together, the light-reflecting segments 72 and the light-absorbing segments 74 define a bar code 70 representing fixed information and variable information. The substrate 82 defines an interior surface (not shown) and an opposed exterior surface 84 of the primary container 80.

As part of the container system, there also exists a material 92 positioned over a portion of the bar code 70, wherein the bar code is detectable using a reader (not shown). The bar code 70 can be disposed anywhere on the substrate 82 or even anywhere on the material 92 provided that the bar code 70 is detectable using a reader (not shown). In accord with other embodiments disclosed herein, the present invention also contemplates any predetermined number of bar codes being disposed on the substrate 82, on the material 92, or both and containing fixed information, variable information, or both.

In another embodiment of the container system, the material 92 is a part or the whole of an overpouch 90. The overpouch 90 may cover a portion or all of the primary container 80. Furthermore, the present invention contemplates that the primary container 80 may have at least one peripheral edge 86 that can be heat-sealed, radio-frequency sealed, or otherwise sealed using any known technique the details of which form no part of the present invention. The material 92 may also be developed into an overpouch 90 by sealing at least one peripheral edge 94 using any known technique, the details of which form no part of the present invention.

The substrate 82 may be made of any chemical composition provided that the reflectivity difference between the light-reflecting segments 72 and the light-absorbing segments 74 define a bar code 70 that is detectable using a reader (not shown). Similarly, the material 92 may be of any known chemical composition provided that if a bar code 70 were disposed thereon, the reflectivity difference between the light-reflecting segments 72 and the light-absorbing segments 74 would allow the bar code 70 to be detectable using a reader (not shown). Preferably, the substrate 82 and the material 92 are of a chemical composition sufficient to withstand the autoclaving process without adhering to each other.

It will be understood that the invention may be embodied in other specific forms, some of which are set forth below, without departing from the spirit or central characteristics thereof. The present examples and embodiments, therefore, are to be considered in all respects as illustrative and not restrictive, and the invention is not to be limited to the details given herein.

EXAMPLES

1. Coding Symbology with a Single Bar Code

As stated above, the identification system of the present invention provides a coding symbology disposed on a substrate. The invention further provides that a plurality of light-reflecting segments, which are separated by spaces, is disposed on the substrate. The unmolested area of the substrate beneath the light-reflecting segments defines light-absorbing segments. Together, the light-reflecting segments and the light-absorbing segments define an image of a bar code. In a preferred form of the invention, the light-reflecting segments and the light-absorbing segments define a negative image of a bar code.

2. Coding Symbology with Two or More Bar Codes

When a second bar code is used, it is formed in the same general manner as the first bar code. That is, a second plurality of light-reflecting segments, which are separated by spaces, is disposed on the substrate. The unmolested area of the substrate beneath the light-reflecting segments defines a second set of light-absorbing segments. Together, the second plurality of light-reflecting segments and the second set of light-absorbing segments define a second bar code. The present invention contemplates that any predetermined number of bar codes could be generated by this procedure. It is understood that when two or more bar codes are employed, the bar codes need not be disposed in physical contact with each other, adjacent to each other, or even on the same substrate, though such embodiments are contemplated.

3. Container Systems a. Primary Container with One Bar Code

The present invention further provides that the substrate that forms a container may be used as a primary container within a variety of container systems, which are described herein. In one embodiment, there is a material positioned over a portion of the substrate, over a bar code located on the substrate, or both. The bar code is disposed on the substrate in a manner heretofore described, is detectable using a reader as heretofore described, and represents fixed information and variable information as heretofore described. Further, the material in each of the container systems may be of the same chemical composition as the substrate heretofore described, although it is not necessary to carry out the invention. The primary container, as embodied in each of the container systems of the present invention, may also be of the same chemical composition as the substrate, or the material, or both, as heretofore described, although it is not necessary in order to carry out the invention. The present invention also provides that the material further comprises a secondary container such as an overpouch and the like.

It is understood that the primary container has an interior surface and an opposing exterior surface. Any predetermined number of bar codes could be disposed on the primary container's interior surface, the exterior surface, or both, provided that a reader can detect each bar code.

As heretofore described, the light-reflecting segments of this particular embodiment also are indicia that can be detected by a reader, and can be either visible or not visible to the naked human eye, or a combination thereof. If the light-reflecting segments are embodied in the visible spectrum, they can be colored white, red, yellow, orange, gold, and silver, or any color provided that, as heretofore described, the reflectivity difference between the light-reflecting segments disposed on the substrate and the light-absorbing segments defined on the substrate allows the light-reflecting segments, and preferably the resulting image, to be detected by a reader.

b. Primary Container with Two or More Bar Codes

In one particular embodiment, a primary container has a substrate, and the substrate has disposed thereon a first bar code. The first bar code is defined by a first plurality of light-reflecting segments that are on the substrate, and a first set of light-absorbing segments that are defined by the spaces in the first plurality. The first bar code represents fixed information, variable information, or both.

In the same embodiment, there exists a second bar code on the substrate of the primary container. The second bar code is defined by a second plurality of light-reflecting segments, and a second set of light-absorbing segments that are defined by the spaces in the second plurality. The second bar code represents fixed information, variable information, or both. It is understood that the particular location of the first bar code and second bar code on the substrate is not critical, provided that both codes remain detectable using a bar code reader. The present invention contemplates that any predetermined number of bar codes could be made using this procedure. As part of the container system, there also exists a material, as heretofore described, that is positioned over a portion of either the first bar code or the second bar code, or both.

c. Primary Container and Material Each with a Bar Code

In yet another embodiment of the present invention, a first bar code representing fixed information or variable information is defined on a substrate that forms part or all of a primary container. The first bar code is formed in the same general manner heretofore described. The substrate has an interior surface and an exterior surface upon which the first bar code could be disposed. This embodiment also provides for a material positioned over a portion of the substrate or the first bar code, or both, as heretofore described. The material could further define a secondary container such as an overpouch, a dustcover, and the like.

The second bar code represents fixed information or variable information, and is defined in the same general manner as described above. That is, the second bar code is defined by a second plurality of light-reflecting segments separated by spaces and disposed thereon, and a second set of light-absorbing segments that are defined by the spaces of the second plurality. The material has a first side adjacent to the primary container and a second side opposed to the first side upon which the second bar code, or any number of bar codes, could be disposed. The combination of the first bar code and the second bar code represent both fixed information and variable information. As with any of the container systems described herein, two or more bar codes could be disposed on the substrate, or on the material, or both.

d. Material with One or with Two or More Bar Codes

The present invention also provides another embodiments for a container system wherein the substrate that forms a portion of the primary container has no bar code image disposed on it. Instead, the material as heretofore described has at least one bar code disposed on it. There may be a single bar code representing both fixed information and variable information. In another embodiment, the substrate still contains no bar code, but the material has two or more bar codes disposed thereon. Each bar code represents fixed information or variable information, or both. Additionally, the material has a first side adjacent to the substrate and a second side opposed thereto upon which any number of bar codes could be disposed. The exact location is not critical, provided that the bar code(s) are detectable by a reader. The bar codes are formed in the same general manner as heretofore described. If desired, the substrate could also contain any predetermined number of bar codes representing fixed information or variable information, or both.

4. Methods

The present invention also provides a method for transferring a negative image bar code onto a web of material. The first step is to provide a web of material. The web can be of any known chemical composition provided that when the negative image bar code is transferred thereon, the reflectivity difference between the negative image bar code and the material is sufficient for the image to be detected using a reader. The next step of the method is to provide a printer capable of transferring a negative image bar code on the web in response to a signal representative of the negative image bar code having fixed information and variable information. The signal may be generated by a computer, software execution, a circuit, or any other known methodology, the details of which form no part of the present invention. The printer may be of any sort known generally, preferably a hot-stamp printer, a laser printer, an ink-jet printer, a flexographic printer, or a thermal printer; and more preferably a thermal transfer printer.

The next step is transferring the signal to the printer and then transferring the negative image bar code onto the web of material. The web, shown generally as reference number 100 in FIG. 1, may be any thermoplastic polymer or a thermoset polymer previously described. As explained above, the exact chemical composition of the material is not critical provided that the reflectivity difference between the negative image bar code and the material is sufficient for the negative image bar code to be detected using a reader.

The negative image bar code can be transferred anywhere on the web, including on the web's interior or exterior surface. The present invention contemplates transferring the negative image bar code onto a web of material that contains another bar code, such as a label copy bar code or even another negative image bar code. The web can also form part or all of a container, or all or part of a material such as those used in the above-described container systems. The present invention also provides for transferring two or more negative image bar codes where the negative image bar codes represent fixed information, variable information, or both, individually or in combination.

Comparative Analysis of Thermal Transfer Versus Hot Stamp Printing a. Background and Materials The quality and size of a thermal transfer printed barcode was compared against a hot-stamp printed barcode. For purposes of this analysis, and as will be explained in greater detail below, each barcode was investigated as to whether it would decode upon scanning and produce an average ANSI letter grade of "B" or higher. Additionally, the inventors examined whether each thermal transfer bar code could be decoded through a 1000 mL overpouch of high density polyethylene having a thickness defined below, and which is commercially available from AtoFina Chemical & Oil under the Fina tradename, specifically Grade 7394.

The verification process employed in this comparative analysis involved a precision instrument PSC Quick Check™ 820 Laser/Mouse Compatible Barcode Verifier (PSC, Inc., Webster, N.Y.) SN: 83987 that is designed to decode bar codes and to evaluate the symbol print quality against a published ANSI standard, namely ANSI X3.182, which is contained in ANSI's *Bar Code Print Quality Guideline*, 1990 edition. The standard is outlined below.

Table 1 displays the tracking group identification given to containers tested. Group A included 100 containers commercially available from Abbott Laboratories (Sterile Water for Injection, USP 2000 mL NDC 0074-7118-07) where each container has a hot stamp barcode printed on the backside of the bag (opposite of label copy). No additional redesign, sterility treatment or packaging etc. for Group A was required or performed on the commercial embodiment. Group B included 300 containers commercially available from Baxter Healthcare Corporation known as PD185 TC Viaflex® solution bag containers with each container having a thermal transfer barcode printed on it. Table 1 also specifies that 60 containers from Group B were designated to and enclosed in an overpouch of a predetermined thickness.

TABLE 1

| Container Group | Container Size | Vendor | Quantity N = | Overpouch Thickness | Overpouch ID |
|---|---|---|---|---|---|
| A | 2000 mL | Abbott | 100 | 4.5 mil N = 100 | N/A |
| B | 1000 mL | Baxter | 300 | 2 mil N = 60 | Stock: 1133-12 Batch: RT 4-6-01 Box 1 |
| | | | | 4 mil N = 60 | Stock: 1133-11 Batch: RT 4-6-01 Box 1 |
| | | | | 6 mil N = 60 | Stock: 1133-10 Batch: RT 4-6-01 Box 1 |
| | | | | 8 mil N = 60 | Stock: 1133-9 Batch: RT 4-6-01 Box 1 |
| | | | | 10 mil N = 60 | Stock: 1133-8 Batch: RT 4-6-01 Box 1 |

Other equipment used in this analysis includes:
Overpouches: (1000 mL) 100% Fina HDPE Grade—7394
1 Roll 3M 810 Scotch® "Magic™" Tape ID: 34-8506-4916-0
1 Roll Thermal Ribbon ID: TTR-71521
N=300 PVC Membrane Tubes,
Stock No. 332116,
Batch No.: NC Oct. 14, 1999 C 15 Box 1.
Cyclohexanone, Lot No.: 4872 T15641 Exp.: Dec. 6, 2001.
N=300 PD185 TC Viaflex® 1000 mL dual-port Containers:
Traceability: 3-16-67-134
Batch No.: NC 8-31-00C76 Box 4
N=100 Sterile Water for Injection, USP 2000 mL NDC 0074-7118-07
Jaguar J27-I4 Thermal Printer, SN: I4B0066
PSC Laser Scanner Model #: 4100+A3043
6-mil aperture Mouse Wand (660 nm)
10-mil aperture Mouse Wand (660 nm)
N=1 Ruler ID: L12687 Calibration Exp: Apr. 6, 2002
Digital Caliper ID: L8435 Calibration Exp: Mar. 30, 2002 b. Printing of Normalized Thermal Transfer Barcodes and the Scanning of Pre-Sterilized, Hot-Stamped Barcodes Prior to printing the thermal transfer barcode onto the containers of Group B (Baxter), the barcode symbology of Group A (Abbott) was first identified, and the encoded data verified against the human readable text, which was accomplished with the QuickCheck™ 820 Barcode Verifier using the Laser Scanner.

Figure 4:
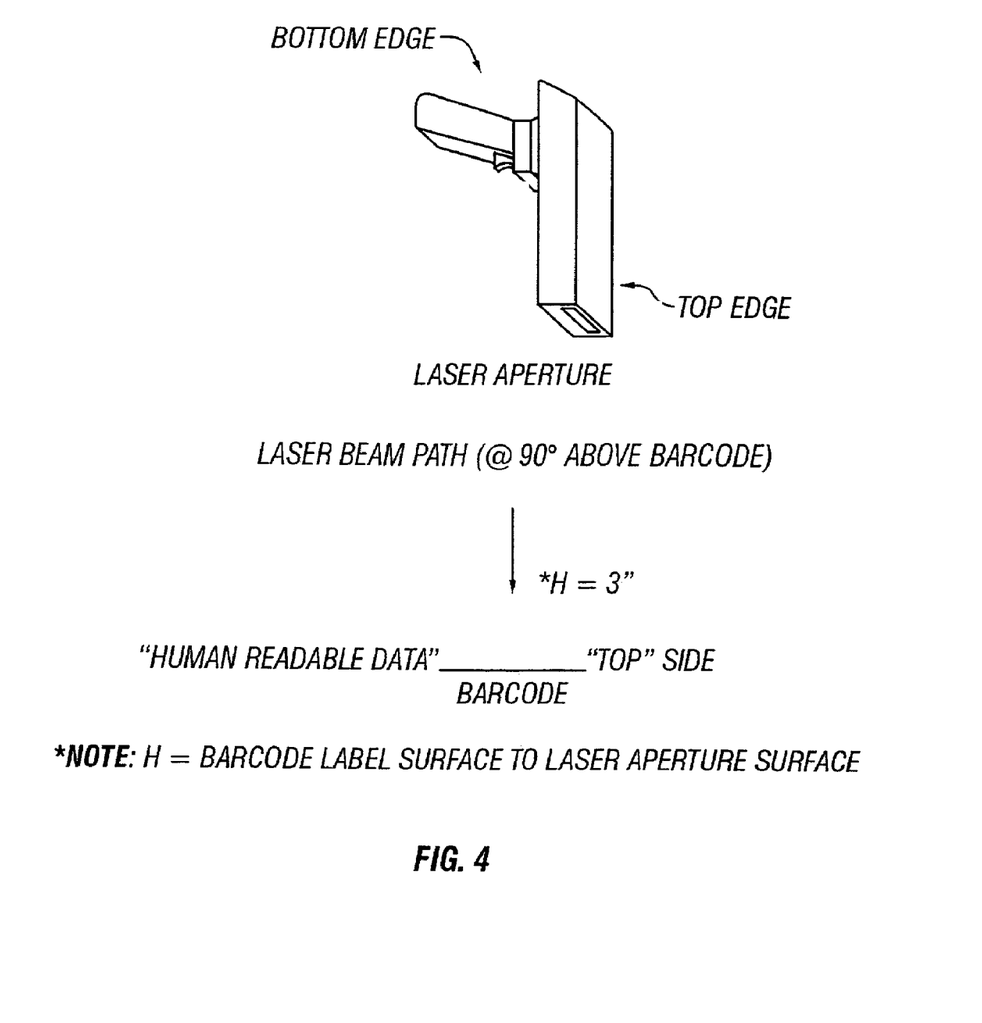
FIG. 4 illustrates the relative position of the Laser Scanner to the barcode in the comparative analysis.

Table 2 identifies the data encoded, format of the human readable data, and dimensional length/width of the Abbott bar code (N=100).

width=total measured barcode length) of the same symbology, number of encoded data characters, and miscellaneous text identified in the Abbott barcode. The following steps detail the manner in which the Abbott barcode identification process was conducted:

The QuickCheck™ 820 Verifier was calibrated using the calibration standard bar code available inside the user manual (*Quick-Check 600 Series User Manual*, $2^{nd}$ edition 1994 Part No QCOM600 available from PSC, Inc.) and then attached to the Laser Scanner ("scanner"). Before any scanning was performed, the scanner was held at a distance of approximately a 3" directly above the barcode. As shown in FIG. 4, the scanner was oriented so that the top edge of the scanner is above the "top" side of the barcode and that the bottom edge of the scanner is above the "human readable data" side of the barcode. Also as shown in FIG. 4, the scanner's aperture surface was oriented to an approximately 90° angle above the barcode.

Figure 5:
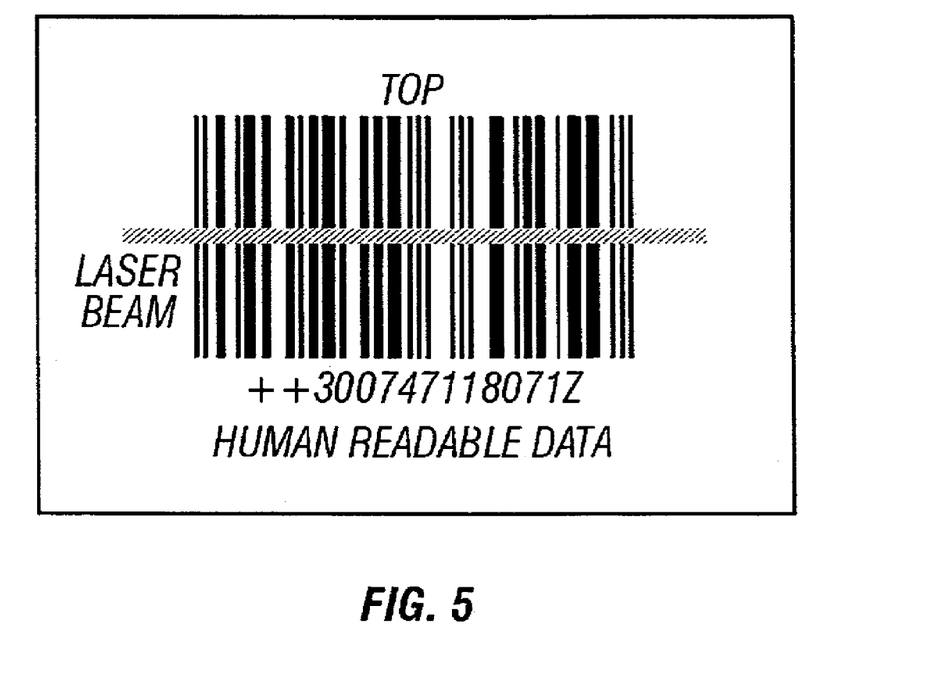
FIG. 5 shows an exemplary coding symbology produced by hot-stamp or thermal transfer methods.

The scanner's trigger was then depressed and held to establish the correct scanning position. No data was recorded on this scan. The laser beam emitted from the scanner's aperture should cross the entire width of the barcode, as is shown in FIG. 5. Without changing the angle or distance as specified above, the laser beam was moved to approximately the middle of the barcode, also shown in FIG. 5, by moving the scanner in a lateral or vertical direction. The scanner's trigger was released, and the scanner's position was held such that the above-described scanning position parameters were not changed.

The scanner's trigger was again depressed and held in order to decode and identify the symbology and encoded

TABLE 2

| | Abbott | | | | |
|---|---|---|---|---|---|
| Symbology | Encoded Data | | Format | Dimensions | |
| Type | Data | Chars | Human Readable (Visual) | X | Y |
| Code 128 (UCC/EAN) | 0100300747118076 | 16 | (01) 0 030074 711807 6 98-4974-R2-6/00 | 72 mm | 12 mm |

Table 2 illustrates the symbology, data, number of characters, format, and dimensional length/width of the Abbott barcodes. The Abbott barcode uses a version of Code 128 under the UCC/EAN standard. The data displayed under the "Encoded Data" column was retrieved using the Laser Scanner of the Quick Check 820™ verifier.

The dimensional width was measured using a calibrated ruler.

The "X" dimension (Length) was measured from the outer side edge of one quiet zone to the outer side edge of the opposite quiet zone using a calibrated ruler.

The "Y" dimension (Height) was measured from the top edge of the quiet zone to the bottom edge of the same quiet zone.

The "Y" dimension (Height) had no analytical bearing on the testing procedures for this experiment.

The Abbott barcode was replicated using the Jaguar Printer's imaging software. Once the dimensional layout and identification was created, the image was downloaded into the Jaguar handset. The thermal printer produced a barcode with the shortest element width (total barcode element data of the Group A barcode. The results of the scan were recorded, and the above steps were repeated to scan the remaining barcode samples of Group A. The trigger was depressed only when the scanner was used to scan a barcode. If an element of the scanning test environment was changed (e.g., lighting), the scanner was recalibrated as per above.

Table 3 shows the replication Abbott's (Group A) barcode identification onto Baxter's (Group B) Viaflex® containers.

The following barcode element width dimensions of N=150 barcodes produced an equivalent ANSI grade to that of the Abbott barcode. (See Table 8)

X dimension: 22 mm Y dimension: 10 mm

The following barcode element width dimensions of N=150 produced a better ANSI grade than that of the Abbott barcode. (See Table 8)

X dimension: 52 mm Y dimension: 10 mm

One barcode was printed on 300 Viaflex® containers and placed inside a plastic bag. The barcodes were printed at random zones or regions of the containers.

TABLE 3

| Symbology Type | Encoded Data Data | Chars | Format Human Readable (Visual) | Dimensions X (N = 150) | Y (N = 150) |
|---|---|---|---|---|---|
| Code 128 (UCC/EAN) | 0100300747118076 | 16 | (01) 0 030074 711807 6 98-4974-R2-6/00 | 22 mm 52 mm | 10 mm 10 mm | c. Shadow Test

The "shadow" test is a visual inspection test implemented in the barcode verification process in order to measure the integrity of the label to the substrate adhesion strength. The test employed Scotch® Magic™ Tape 810, which is available commercially from 3M and identified above, whereby the tape produces a shadow of that barcode to which it is applied. This shadow is the result of the printer's ribbon label adhering to the tape once it is applied and removed from the barcode. The quantitative amount of "shadow" that is observed on the tape is then used to assess the integrity of the barcode surface that will survive abrasive contact or resist melting from extreme temperature conditions. An acceptable tape test result yielded less than approximately 50% of the ribbon label is transferred onto the tape. This test also helped visually assess any degradation of the barcode quality. The test was performed immediately following the print production process and was done only for the 300 Group B samples. Table 4 outlines the results:

TABLE 4

Baxter

| Print Size: | Sterilization Phase: | Sample Size: | 0–50%: | 51–100%: |
|---|---|---|---|---|
| 22 mm × 10 mm | Pre | 150 | 150 | 0 |
| 52 mm × 10 mm | Pre | 150 | 150 | 0 |

The scotch tape was applied to the barcode immediately following the print. A small trace (0–50%) of the foil was visible on the strip of tape for all prints. The scotch tape test result yielded less than 50% label transfer on the scotch tape, which qualified it as an acceptable print. There were no visible peel streaks created in any of the barcodes after the scotch tape was removed from it. Table 4 reflects data results generated for both Group B barcodes (1) 52 mm×10 mm and (2) 22 mm×10 mm. A sample size of 150 each was taken from each group.

d. Barcode Verification Scanning: ANSI Grade Report (Pre-Sterilization)

The ANSI Grade Report is an individual scan profile measurement report of the number of scans used to get a final ANSI Symbol Grade. This report uses the Scan Profile methodology found in ANSI's *Bar Code Print Quality Guideline*, which is identified above. The following steps were followed for the Viaflex® (Group B) containers. There were no results reported for the Abbott (Group A) barcodes because the Abbott container pre-sterilization stage was not applicable to this protocol.

First, a 6-mil aperture mouse wand was attached to the Scanner. Second, the Quick Check 820 scanner was calibrated (as set forth earlier) prior to scanning the barcode for identification. The Quick Check Verifier was then configured to achieve 10 scans per barcode for extended accuracy. Each individual scan of the 10 averaged by the Scanner was recorded during scanning. The Scanner then reported each scan grade as an alpha character. Each barcode on the 300 Group B containers was scanned by rolling the mouse wand over and across the middle of the barcode. Table 5 details the results.

TABLE 5

ANSI Grade (Pre-Sterilization) - Results:
Baxter (Group B) - 6 mil Mouse Wand

| Print Method: | Sterilization Phase: | Sample Size: | Scan Pass: | Average Grade: | Dimensions X | Y |
|---|---|---|---|---|---|---|
| Thermal Transfer | Pre- | 150 | 10 | C | 22 mm | 10 mm |
| Thermal Transfer | Pre- | 150 | 10 | B | 52 mm | 10 mm |

Table 5 indicates that the total average ANSI grade produced through thermal transfer print yielded a "C" out of a sample size of 150 (22 mm×10 mm barcodes) and a grade of "B" out of a sample size of 150 (52mm×10 mm barcodes). The sum or total average is the average of each individual sample scan average after a scan pass of 10. A 6-mil aperture mouse wand was used to test the grade for the thermal printed barcodes. These samples were tested after printing and prior to fill and pouching.

e. Filling

Table 6 shows the fill and air volume used for the Viaflex® (Group B) containers:

TABLE 6

| Container Size | Solution Volume (mL) | Air Volume Range (cc) |
|---|---|---|
| 1000 mL | 1050 mL ± 20 mL | 55 cc ± 20 cc |

All 300 containers were filled using the specifications listed above in Table 1.

f. Overpouch Assembly and Sterilization Cycles

All 300 Group B containers were transferred to the Vertrod Sealer. A stock roll of 100% HDPE film was cut to the lengths of 13½"×6½" (Refer to Table 1 for thickness of individual stock rolls). The film was then sealed manually using the Vertrod sealer. No defects were observed in the overpouch material. The containers were loaded inside the overpouch and then sealed. The samples were loaded on the sterilization trays with the barcode print facing up, whereby the barcode was not in direct contact with the tray. A sterilization cycle was then performed according to Specification 14-04-01-119 Cycle No. 04-026 at the maximum time and temperature conditions (i.e, 56.0 minutes at 252° F.).

g. Barcode Verification Scanning: Decode on Scan (Post-Sterilization)

TABLE 7

| GROUP | Samples N # | Read on Scan Pass | Fail | Sterilization Pre | Post |
|---|---|---|---|---|---|
| Baxter | 300 | 300 | 0 | N/A | 300 |
| Abbott | 100 | 100 | 0 | N/A | 100 |

Table 7 shows that all barcodes were able to be decoded upon scanning. All 300 barcodes on the Viaflex® (Group B) containers and all 100 barcodes on the (Group A) Abbott containers were decoded through their respective overpouches with the Laser Scanner using scanning procedures detailed above. A maximum of 10 scan attempts were performed. The number of scans actually required to decode each individual units was not recorded. Only an observational note would be recorded for units failing to decode, of which there were none.

In some cases, water droplets were visible inside the Baxter (Group B) overpouch as a result of recent sterilization. The overpouch was then pressed against the primary container film surface to disperse or remove the water droplets. Human hands were used to smooth away wrinkles that were present in the overpouch. The Abbott overpouches were observed to be completely dry. No overpouches needed to be removed for any barcode to be decoded.

h. Barcode Verification Scanning: ANSI Grade Report (Post-Sterilization)

For each of the 400 samples in Groups A and B, the respective overpouch was removed, the port tubes were cut off using scissors, and the samples were completely drained of all fluid. The scanning procedures detailed above were then employed for scanning each barcode and generating an ANSI grade report. The 300 Viaflex® samples were scanned using the 6-mil aperture mouse wand. The 100 Abbott samples could not be scanned using the 6-mil aperture or 10-mil aperture mouse wand. Instead, the Laser Scanner was used. One inherent difference between the mouse wand and Laser Scanner is that the mouse wand provides a reflectance grade where the Laser Scanner does not. This information may be used as a supplemental analytical tool guide to assess the quality of the barcode print in a pre-production print quality control verification process.

Next, a 15 square inch piece from each overpouch used to pouch the 300 Viaflex® samples was cut and pressed firmly over the barcode for scanning the barcode through the cut overpouch section. Human fingers were used to smooth out any wrinkles that were present The same scanning procedures detailed above were used to scan the barcode through the overpouch and generate an ANSI grade report. All scans through an overpouch were achieved using the 6-mil aperture mouse wand. This same procedure was repeated for the 100 Abbott barcodes except that the Laser Scanner was used instead of the 6-mil wand. Further, the Group B barcodes were rescanned using the Laser Scanner to validate that the mouse wand and Laser Scanner could achieve the same end results. The following tables and graphs illustrate the results.

TABLE 8

ANSI Grade (Post-Sterilization); Out of Pouch - Results:

| Group: | Sterilization Phase: | Sample Size: | Scan Pass: | Average Grade: | Dimensions X | Y | N = |
|---|---|---|---|---|---|---|---|
| Baxter | Post | 150 | 10 | C | 22 mm | 10 mm | 150 |
| Baxter | Post | 150 | 10 | B | 52 mm | 10 mm | 150 |
| Abbott | Post | 100 | 10 | C | 72 mm | 12 mm | 100 |

Table 8 indicates that the total average ANSI grade produced through thermal transfer print and hot stamp. The sum or total average grade is the average of each individual sample average after a 10 scan passes. The above tables also reflect the average ANSI Grade of the barcodes tested out of their respective pouches. These samples were tested after printing and after filling and pouching.

Thermal Transfer Barcodes (Group B):
  The thermal transfer print yielded an average ANSI grade "C" out of a sample size of 150 for the 22 mm×10 mm Baxter barcode and an average ANSI grade of "B" for the 52 mm×10 mm Baxter barcode. A 6-mil aperture mouse wand was used to test the grade for the thermal printed barcodes. In addition, a Laser Scanner was used and yielded the same results.

Hot Stamp (Group A):
  The hot stamp print yielded an average ANSI grade "C" out of a sample size of 100 in both table results. A Laser Scanner was used to scan the hot stamp barcodes. A scan using a 6-mil aperture or 10-mil aperture mouse wand aperture was not achievable when testing the hot stamp barcode.

TABLE 9

ANSI Grade (Post-Sterilization); In Pouch - Results:

| Print Method: | Sterilization: | Sample Size: | Scan Pass: | Pouch Thickness (mils): | Average Grade: |
|---|---|---|---|---|---|
| Baxter - 22 mm × 10 mm Barcode (Laser Scanner) | | | | | |
| Thermal | Post | 21 | 10 | 2 | C |
| Thermal | Post | 21 | 10 | 4 | C |
| Thermal | Post | 21 | 10 | 6 | C |
| Thermal | Post | 21 | 10 | 8 | C |
| Thermal | Post | 21 | 10 | 10 | C |
| Baxter - 22 mm × 10 mm Barcode (Mouse Wand) | | | | | |
| Thermal | Post | 21 | 10 | 2 | C |
| Thermal | Post | 21 | 10 | 4 | C |
| Thermal | Post | 21 | 10 | 6 | C |
| Thermal | Post | 21 | 10 | 8 | C |
| Thermal | Post | 21 | 10 | 10 | C |

TABLE 10

| Print Method: | Sterilization: | Sample Size: | Scan Pass: | Pouch Thickness (mils): | Average Grade: |
|---|---|---|---|---|---|
| Baxter - 52 mm × 10 mm Barcode (Laser Scanner) | | | | | |
| Thermal | Post | 21 | 10 | 2 | B |
| Thermal | Post | 21 | 10 | 4 | B |
| Thermal | Post | 21 | 10 | 6 | B |
| Thermal | Post | 21 | 10 | 8 | B |
| Thermal | Post | 21 | 10 | 10 | B |

TABLE 10-continued

Baxter - 52 mm × 10 mm Barcode (Mouse Wand)

| Print Method: | Sterilization: | Sample Size: | Scan Pass: | Pouch Thickness (mils): | Average Grade: |
|---|---|---|---|---|---|
| Thermal | Post | 21 | 10 | 2 | B |
| Thermal | Post | 21 | 10 | 4 | B |
| Thermal | Post | 21 | 10 | 6 | B |
| Thermal | Post | 21 | 10 | 8 | B |
| Thermal | Post | 21 | 10 | 10 | B |

TABLE 11

Abbott - 72 mm × 12 mm Barcode (Laser Scanner)

| Print Method: | Sterilization: | Sample Size: | Scan Pass: | Pouch Thickness (mils): | Average Grade: |
|---|---|---|---|---|---|
| Hot Stamp | Post | 42 | 10 | 4.5 | C |

Table 9 indicates that the total average ANSI grade of "C" was yielded for 42 (21 Laser Scanner+21 Mouse Wand) 22 mm×10 mm Baxter barcode samples. Table 10 indicates that the total average ANSI grade of "B" was yielded for 42 (21 Laser Scanner+21 Mouse Wand) 52 mm×10 mm Baxter barcode samples. Table 11 also reflects the average ANSI Grade of the 42 (Laser Scanner) hot stamp (Abbott) barcodes tested through their respective pouches yielded a "C". The sum or total average is the average of each individual sample average after 10 scan passes. A 6-mil aperture mouse wand and a Laser Scanner were used to test the grade for the thermal (Baxter) barcodes. Viaflex® sample numbers 130–150 of each Baxter barcode dimension size were used to test the print quality through the various overpouches thickness. These samples were tested after printing and after fill and pouching.

The above show that the thermal transfer print process was able to reduce the Abbott barcode image size (width) by approximately 69% and produce an equal ANSI Grade Average of "C" both out of pouch and in pouch. In the second part of this experiment, the thermal transfer print process was able to reduce the Abbott barcode image size (width) by 28% and produce an average grade of "B" both out of pouch and in pouch, whereby the Abbott barcode only reported an ANSI Grade Average read of "C" (out of pouch). The thermal transfer print process allowed for flexibility of desired barcode image print dimensions through the control of software. The barcode image quality was verified under the process of Barcode Print Verification. The verification process required that the Group A and Group B barcodes could be scanned and barcodes, illustrates that the image quality of the barcodes produced by thermal transfer requires a lesser need for reprinting bad barcodes based upon the higher quality of print that it produces.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

We claim:

1. A medical container having a negative image bar code comprising:
    a medical container comprising transparent plastic film;
    a first plurality of light-reflecting segments disposed on the medical container film, wherein the medical container film defines first spaces that separate the first plurality of light-reflecting segments, wherein the film defining the first spaces also itself defines a first set of light-absorbing segments, and wherein the first plurality and the first set define a first negative image bar code representing fixed information;
    a second plurality of light-reflecting segments disposed on the medical container film, wherein the medical container film defines second spaces that separate the second plurality of light-reflecting segments, wherein the film defining the second spaces also itself defines a second set of light-absorbing segments, wherein the second plurality and the second set define a second negative image bar code representing variable information, wherein the variable information comprises at least one selected from the group consisting of: lot number, batch number, expiration date, serial number, production time, price, and concentration; and
    wherein the first bar code and the second bar code are each detectable using a reader.

2. The medical container of claim 1 wherein the medical container is flexible.

3. The medical container of claim 1 wherein the first or second negative image bar code comprises a symbology selected from the group consisting of: Code 16K, Code 39, Code 49, Codabar, Code 128, UPC-E, UPC-A, EAN-8, EAN-13, Reduced Space Symbology, composite symbol, PDE-417, and Interleaved 2-of-5.

4. The medical container of claim 1 wherein the variable information comprises the lot number and expiration date and wherein the fixed information comprises a National Drug Code Number.

5. The medical container of claim 1 wherein the medical container film comprises a multi-layer film.

6. The medical container of claim 1 wherein the medical container film comprises a polyvinyl chloride material.

7. The medical container of claim 1 wherein the medical container film comprises a polyester material.

8. The medical container of claim 1 wherein the medical container film comprises polyolefin material.

9. The medical container of claim 1 wherein the light-reflecting segments have the color white.

10. The medical container of claim 1 wherein the light reflecting segments are not visible to the naked eye.

11. The medical container of claim 1 wherein each negative image bar code has a length less than or equal to 52 millimeters.

12. The medical container of claim 1 further comprising an overpouch, the medical container being disposed within the overpouch and the negative image bar code being decodable upon scanning through said overpouch.

13. The medical container of claim 12 wherein said overpouch has a wall thickness of at least 2 millimeters.

14. A container system comprising:
    a medical container comprising transparent plastic film;
    a plurality of light-reflecting segments disposed on the medical container film, wherein the medical container film defines spaces that separate the plurality of light-reflecting segments, wherein the film defining the spaces also itself defines light-absorbing segments, wherein the light reflecting segments and the light-absorbing segments define a negative image bar code representing fixed information and variable information, and a material positioned over a portion of the bar code, wherein the portion has an A or B scan grade when decoded through the material and in accordance with ANSIX3.182.

15. The container system of claim 14 wherein the negative image bar code has a length less than 72 millimeters.

16. The container system of claim 14 wherein the negative image bar code has a length less than or equal to 52 millimeters.

17. A container system comprising:
a medical container comprising transparent plastic film;
a first plurality of light-reflecting segments disposed on the medical container film, wherein the medical container film defines first spaces that separate the first plurality of light-reflecting segments, wherein the film defining the first spaces also itself defines a first set of light-absorbing segments, and wherein the first plurality and the first set define a first negative image bar code representing fixed information;
a second plurality of light-reflecting segments disposed on the medical container film, wherein the medical container film defines second spaces that separate the second plurality of light-reflecting segments, wherein the film defining the second spaces also itself defines a second set of light-absorbing segments, and wherein the second plurality and the second set define a second negative image bar code representing variable information; -and
a material positioned over a portion each bar code, wherein each portion has an A or B scan grade when decoded through the material and in accordance with ANSIX3.182.

18. The container system of claim 17 wherein the negative image bar code has a length less than 72 millimeters.

19. The container system of claim 17 wherein the negative image bar code has a length less than or equal to 52 millimeters.

20. The container system of claim 17 wherein the second plurality of light-reflecting segments are indicia having a color selected from the group consisting of white, red, yellow, orange, gold, and silver.

21. The medical container of claim 17 wherein the variable information comprises the lot number and expiration date and wherein the fixed information comprises a National Drug Code Number.

22. The medical container of claim 17 wherein the medical container film comprises a multi-layer film.

23. The medical container of claim 17 wherein the medical container film comprises a polyvinyl chloride material.

24. The medical container of claim 17 wherein the medical container film comprises polyolefin material.

25. The medical container of claim 17 wherein the light-reflecting segments have the color White.

26. The medical container of claim 17 wherein the light reflecting segments are not visible to the naked eye.

27. A container system comprising:
a medical container comprising transparent plastic film;
a plurality of light-reflecting segments disposed on the medical container film, wherein the medical container film defines spaces that separate the plurality of light-reflecting segments, wherein the film defining the spaces also itself defines a set of light-absorbing segments, wherein the plurality and the set define a negative bar code representing variable information;
a material positioned over a portion of the bar code, and wherein the portion of the bar code has an A or B scan grade when decoded through the material and in accordance with ANSIX3.182.

28. The container system of claim 27 wherein the medical container is flexible.

29. The container system of claim 28 wherein the material is an overpouch comprising polyethylene, and wherein the overpouch has a thickness of at least 2 mils.

30. The container system of claim 29 wherein the thickness of the overpouch is at least 4 mils.

31. The container system of claim 29 wherein the thickness of the overpouch is at least 8 mils.

32. The container system of claim 28 wherein each bar code has a length less than 52 millimeters.

33. The container system of claim 28 wherein each bar code has a length less than 72 millimeters.

34. The medical container of claim 27 wherein the variable information comprises the lot number and expiration date.

35. The medical container of claim 27 wherein the medical container film comprises a multi-layer film.

36. The medical container of claim 27 wherein the medical container film comprises polyvinyl chloride material.

37. The medical container of claim 27 wherein the medical container film comprises a polyester material.

38. The medical container of claim 27 wherein the medical container film comprises polyolefin material.

39. The medical container of claim 27 wherein the light-reflecting segments have the color white.

40. The medical container of claim 27 wherein the light reflecting segments are not visible to the naked eye.

41. A container system comprising:
a flexible container comprising a transparent plastic film;
a plurality of light-absorbing segments disposed on the flexible container film, wherein the flexible container film defines spaces that separate the plurality of light-reflecting segments, wherein the film defining the spaces also itself defines light-absorbing segments, wherein the light-reflecting segments and the light-absorbing segments define a negative image bar code representing fixed information and variable information, wherein the variable information comprises at least one selected from the group consisting of: lot number, batch number, expiration date, serial number, production time, price, and concentration, and wherein the bar code is detectable using a reader;
a material positioned over a portion of the bar code, wherein the portion of the bar code has an A or B scan grade when decoded through the material and in accordance with ANSIX3.182.

42. The container system of claim 41 wherein the bar code has a length less than 72 millimeters.

* * * * *